United States Patent Office 3,484,381
Patented Dec. 16, 1969

3,484,381
METHOD OF PREPARING PHOSPHORS
Ramon L. Yale and James E. Mathers, Ulster, Pa., assignors to Sylvania Electric Products Inc., a corporation of Delaware
No Drawing. Filed Aug. 3, 1967, Ser. No. 658,046
Int. Cl. C09k 1/04, 1/44
U.S. Cl. 252—301.4    7 Claims

ABSTRACT OF THE DISCLOSURE

In the manufacture of multivalent rare earth metal activated, yttrium and/or gadolinium oxide or vanadate phosphors, the cation sources necessary for the formation of the phosphor, generally the rare earth metal activator, such as europium, together with the yttrium, are dissolved in a mineral acid. A strong oxidizing agent, preferably hydrogen peroxide, is then added. The solution is mixed with oxalic acid to coprecipitate the cations as the oxalate. The coprecipitate is then washed, preferably in a dilute oxalic acid solution, filtered and then dried. The dry product is blended with a vanadate source, preferably ammonium metavanadate, and the phosphor is synthesized according to techniques well known to the art.

BACKGROUND OF THE INVENTION

Field of the invention

This invention relates to the production of rare earth metal activated, yttrium and/or gadolinium oxide or vanadate phosphors.

SUMMARY OF THE INVENTION

In the manufacture of the yttrium and/or gadolinium oxide or vanadate phosphors, yttrium and/or gadolinium oxide is dissolved in a strong acid, such at nitric, hydrochloric or sulphuric. The desired quantity of activator as the oxide, generally between about 0.001 to 0.1 gram atom per gram atom of yttrium and/or gadolinium, is also dissolved in the acid.

A strong oxidizing agent, preferably hydrogen peroxide, is added to the solution. Other oxidizing agents which may be added include, for example, ammonium persulfate, alkali metal perchlorate, such as potassium perchlorate, or oxygen gas.

We believe that the use of the strong oxidizing agent prevents the reduction of $Eu^{+3}$ to $Eu^{+2}$ during preparation of the phosphor. During the decomposition of peroxyoxalates, $CO_2$ is formed and not, CO, which would tend to give a reducing atmosphere. $Eu^{+3}$-activated phosphors are very sensitive to state of oxidation. By preventing the formation of reducing CO, a more favorable environment for maintaining $Eu^{+3}$ is realized.

An activator which has particular applicability in the yttrium and/or gadalinium vanadate or oxide matrix is europium, but Pr, Sm, Tb, Dy, Ho, Er, Tm, can also be used, alone or in combination with each other, within the conventional ranges of activators for such matrices. Such ranges are generally in the order of 0.001 to 0.1 gm. atom per gram atom of yttrium and/or gadolinium. Additional dopants such as bismuth, calcium and/or manganese can be added also.

When using such oxidizing agents, the cathode ray brightness of the phosphor is increased on the average of three percent over similar phosphors which were not prepared using the treatment. In Table I following, a standard phosphor (Sample 1) was equated to 100% CRT brightness. A control of yttrium vanadate activated by europium (Sample 2) produced 104% CRT brightness. The preparation of the control included treatment with an oxidizing agent. Those phosphors which were treated with the oxidizing agent (Samples 3, 4 and 5) averaged a three percent increase in brightness over the control. No shift in the emission color occurred.

TABLE I

Effect of $H_2O_2$ treatment on cathode-ray brightness

| Sample No. | Oxidizing agent treatment | CRT brightness, Percent vs. Std. | Color coordinates |
|---|---|---|---|
| 1 | No | 100 | X .674, Y .326 |
| 2 | No | 104 | Equal |
| 3 | Yes | 107 | Equal |
| 4 | Yes | 105 | Equal |
| 5 | Yes | 109 | Equal |

In Table II following, the brightness of the phosphor upon ultraviolet excitation is recorded. A standard (Sample 1) is equated to 100% and a control (Sample 2) without oxidizing agent treatment is measured and compared to samples with the oxidizing agent treatment. As is apparent, at each measurement point, the treated phosphors are materially brighter than untreated standard (Sample 2).

TABLE II

Effect of $H_2O_2$ treatment on UV brightness

| Sample No. | Oxidizing agent treatment | UV Brightness, percent vs. Std. | | | | Body color, Percent Reflectance vs.Std | |
|---|---|---|---|---|---|---|---|
| | | 254 nm. | 325 nm. | 396 nm. | 466 nm. | 365 nm. | 420 nm. |
| 1 (Control) | No | 100 | 100 | 100 | 100 | 100 | 100 |
| 2 | No | 88 | 93 | 71 | 93 | 36 | 52 |
| 3 | Yes | 94 | 98 | 95 | 97 | 57 | 68 |
| 4 | Yes | 91 | 95 | 84 | 94 | 74 | 78 |
| 5 | Yes | 96 | 99 | 99 | 99 | 79 | 81 |

DESCRIPTION OF PREFERRED EMBODIMENTS

The following specific examples are offered as a further explanation of our invention and are not intended to be limitative upon the claims.

Example I

Dissolve 12.87 gms. of $Y_2O_3$ and 1.05 gms. of $Eu_2O_3$ in nitric acid. Fifty ml. of a 30% solution of hydrogen peroxide is added to the solution and digested for ½ hour at 70–80° C. Two hundred ml. of a 20% by weight solution of oxalic acid is added to the solution and the yttrium and europium are coprecipitated as the corresponding oxalates. The precipitate is washed in a 2% oxalic acid solution, filtered and dried. 28.08 gms. of $NH_2VO_3$ are blended with the yttrium-europium oxalate mixture and the mixture is fired for two hours at a temperature of 1000° C. to produce an yttrium vanadate-europium phosphor.

Example II

Dissolve 20.66 gms. $Gd_2O_3$ and 1.05 gms. of $Eu_2O_3$ in nitric acid. Fifty ml. of a 30% solution of hydrogen peroxide is added to the solution and digested for ½ hour at 70–80° C. Two hundred ml. of a 20% by weight solution of oxalic acid is added to the solution and the gadolinium and europium are coprecipitated as the corresponding oxalates. The precipitate is washed in a 2% oxalic acid solution, filtered and dried. 28.08 gms. of $NH_2VO_3$ are blended with a gadolinium europium oxalate mixture and the mixture is fired for two hours at a temperature of 1000° C. to produce a gadolinium vanadate-europium phosphor.

Example III

Dissolve 12.87 gms. of $Y_2O_3$ and 1.05 gms. of $Eu_2O_3$ in nitric acid. Fifty ml. of a 30% by weight solution of $H_2O_2$ are added to the solution and then digested for ½ hour at 70–80° C. Two hundred ml. of a 20% by weight solution of oxalic acid solution is then added to the solution and the yttrium and europium are coprecipitated as the corresponding oxalates. The precipitate is washed in a 2% oxalic acid solution, filtered and dried. The mixture is then fired at 1250° C. for four hours to produce a yttrium oxide-europium phosphor.

Example IV

Dissolve 20.66 gms. $Gd_2O_3$ and 1.05 gms. of $Eu_2O_3$ in nitric acid. Fifty ml. of a 30% by weight solution of $H_2O_2$ are added to the solution and then digested for ½ hour at 70–80° C. Two hundred ml. of a 20% by weight solution of oxalic acid solution are then added to the solution and the gadolinium and europium are coprecipated and the corresponding oxalates. The precipitate is washed in a 2% oxalic acid solution, filtered and dried. The mixture is then fired at 1250–1500° C. for four hours to produce a gadolinium oxide-europium phosphor.

What we claim is:

1. In the manufacture of a multivalent-rare earth metal activated, phosphor having a matrix selected from the group consisting of the oxides and vanadates of yttrium and gadolinium and a multivalent rare earth metal activator, the steps which comprise: forming a solution of cations necessary to form said phosphor by dissolving cation sources in an acid; adding sufficient oxidizing agent to oxidize said multivalent-rare earth metal activator to its highest oxidation state after dissolution of said cations and then adding oxalic acid to said solution whereby said cations are coprecipitated as the oxalate.

2. The process according to claim 1 wherein the coprecipitate is washed in a dilute oxalic acid solution filtered and dried.

3. The process according to claim 2 wherein the dried coprecipitate is mixed with a source of vanadate cations and fired to produce a phosphor.

4. The process according to claim 1 wherein the oxidizing agent is hydrogen peroxide.

5. The process according to claim 1 wherein the cation sources are dissolved in a strong mineral acid.

6. The process according to claim 3 wherein the vanadate anion source is ammonium metavanadate.

7. The process according to claim 1 wherein said rare earth metal activator is at least one metal selected from the group consisting of praseodymium, samarium, terbium, dysprosium, holmium, erbium, thulium and europium.

References Cited

UNITED STATES PATENTS

| | | | |
|---|---|---|---|
| 3,357,925 | 12/1967 | Levine et al. | 252—301.4 |
| 3,424,692 | 1/1969 | Toma et al. | 252—301.4 |

TOBIAS E. LEVOW, Primary Examiner

ROBERT D. EDMONDS, Assistant Examiner